(12) United States Patent
Rogers

(10) Patent No.: US 10,480,208 B1
(45) Date of Patent: Nov. 19, 2019

(54) REMOVABLE MOTORCYCLE COVER

(71) Applicant: Enoch Rogers, Waldorf, MD (US)

(72) Inventor: Enoch Rogers, Waldorf, MD (US)

( * ) Notice: Subject to any disclaimer, the term of this patent is extended or adjusted under 35 U.S.C. 154(b) by 0 days.

(21) Appl. No.: 15/246,931

(22) Filed: Aug. 25, 2016

(51) Int. Cl.
*E04H 15/06* (2006.01)
*E04H 15/40* (2006.01)
*E04H 15/48* (2006.01)

(52) U.S. Cl.
CPC .............. *E04H 15/06* (2013.01); *E04H 15/40* (2013.01); *E04H 15/48* (2013.01)

(58) Field of Classification Search
CPC .......... E04H 15/06; E04H 15/40; E04H 15/48
USPC ......... 296/136.07, 136.1, 136.01; 135/88.04; 280/288.4
See application file for complete search history.

(56) References Cited

U.S. PATENT DOCUMENTS

| 4,681,362 A | 7/1987 | Taylor | |
|---|---|---|---|
| 5,072,987 A | 12/1991 | Allen | |
| 5,458,390 A | 10/1995 | Gilbert | |
| 7,690,390 B2 * | 4/2010 | Hopkins | B62J 17/08 135/88.03 |
| 2008/0048413 A1 * | 2/2008 | Salinas | B62J 17/08 280/304.3 |

* cited by examiner

*Primary Examiner* — Joseph D. Pape

(57) ABSTRACT

A removable motorcycle cover including a waterproof rectangular cover. Each of an upper right loop, an upper left loop, a lower right loop, and a lower left loop of a pair of loops is attached to each of an upper right corner, an upper left corner, a lower right corner, and a lower left corner, respectively, of the waterproof rectangular cover. Each of a right rod and a left rod of a pair of flexible rods is disposed within a right edge and a left edge, respectively, of the waterproof rectangular cover. Each of the upper right loop and the upper left loop is engageable around each of a pair of front lights of the motorcycle, and each of the lower right loop and the lower left loop is engageable around each of a pair of rear lights of the motorcycle.

3 Claims, 3 Drawing Sheets

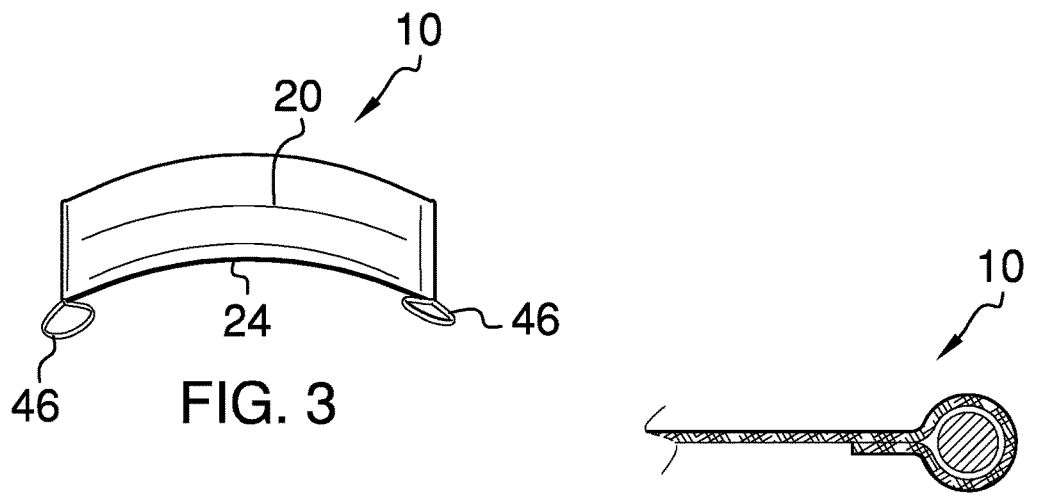
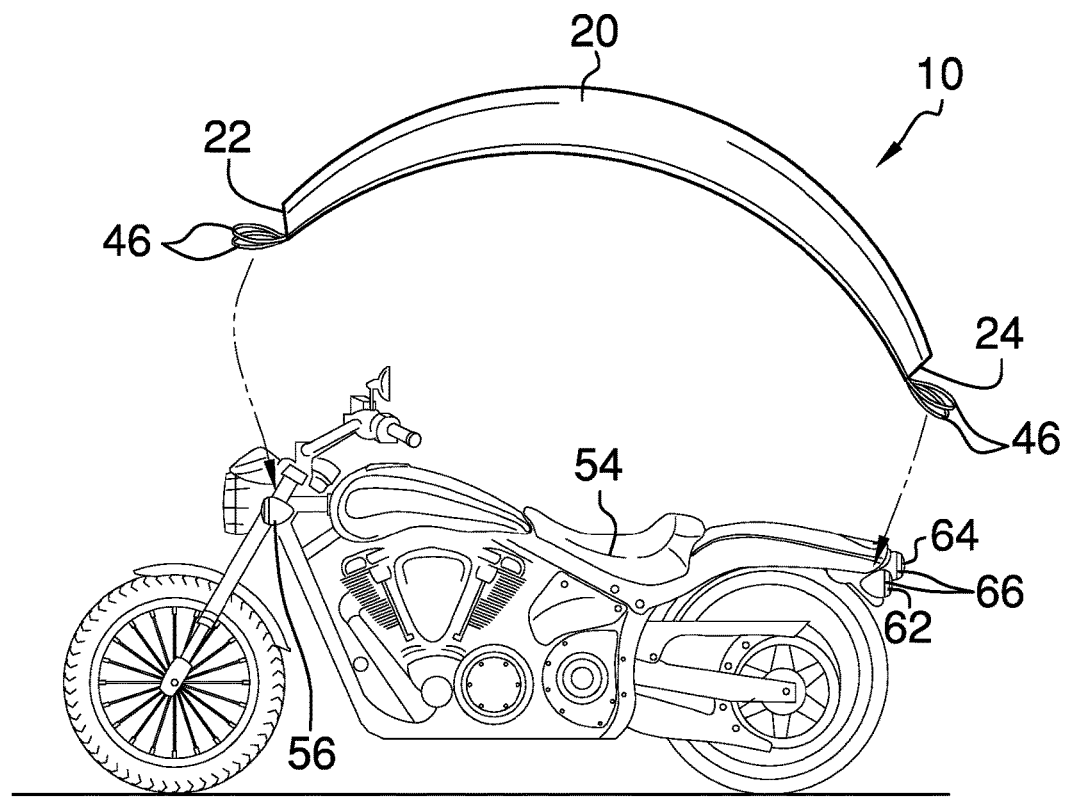

REMOVABLE MOTORCYCLE COVER

BACKGROUND OF THE INVENTION

Various types of motorcycle canopies are known in the prior art. However, what has been needed is a removable motorcycle cover including a waterproof rectangular cover, and each of an upper right loop, an upper left loop, a lower right loop, and a lower left loop of a pair of loops attached to each of an upper right corner, an upper left corner, a lower right corner, and a lower left corner, respectively, of the waterproof rectangular cover. What has been further needed is for each of a right rod and a left rod of a pair of flexible rods to be disposed within a right edge and a left edge, respectively, of the waterproof rectangular cover. Lastly, what has been needed is for each of the upper right loop and the upper left loop to be engageable around each of a pair of front lights of the motorcycle, and for each of the lower right loop and the lower left loop to be engageable around each of a pair of rear lights of the motorcycle. The removable motorcycle cover thus provides protection from the outside elements to both a motorcycle and a rider of the motorcycle. The removable motorcycle cover is particularly well suited for motorcycle officers who must remain parked on a motorcycle for extended periods of time in potentially inclement weather and direct sunlight.

FIELD OF THE INVENTION

The present invention relates to motorcycle canopies, and more particularly, to a removable motorcycle cover.

SUMMARY OF THE INVENTION

The general purpose of the present removable motorcycle cover, described subsequently in greater detail, is to provide a removable motorcycle cover which has many novel features that result in a removable motorcycle cover which is not anticipated, rendered obvious, suggested, or even implied by prior art, either alone or in combination thereof.

To accomplish this, the present removable motorcycle cover includes a foldable waterproof rectangular cover having a front edge, a back edge, a right edge, a left edge, an upper right corner, an upper left corner, a lower right corner, and a lower left corner. Each of an upper right loop, an upper left loop, a lower right loop, and a lower left loop of a pair of loops is attached to each of the upper right corner, the upper left corner, the lower right corner, and the lower left corner, respectively. Each of a right rod and a left rod of a pair of flexible rods is continuously disposed within the right edge and the left edge, respectively, of the foldable waterproof rectangular cover.

A length of the foldable waterproof rectangular cover substantially conforms to a length of a motorcycle. Each of the upper right loop and the upper left loop is removably engageable around each of a front right light and a front left light of a pair of front lights of the motorcycle, and each of the lower right loop and the lower left loop is removably engageable around each of a rear right light and a rear left light of a pair of rear lights of the motorcycle. The foldable waterproof rectangular cover is thus removably disposed atop the motorcycle. A length of the foldable waterproof rectangular cover is optionally in a range of approximately 167.64 centimeters (5.5 feet) to 182.88 centimeters (6 feet), and a width of the foldable waterproof rectangular cover is optionally in a range of approximately 76.2 centimeters (2.5 feet) to 91.44 centimeters (3 feet) in order to fully cover both the motorcycle and a rider from inclement weather and sun. The pair of flexible rods allows for the foldable waterproof rectangular cover to be selectively shaped above the motorcycle depending upon the size and preference of the rider.

Thus has been broadly outlined the more important features of the present removable motorcycle cover so that the detailed description thereof that follows may be better understood and in order that the present contribution to the art may be better appreciated.

BRIEF DESCRIPTION OF THE DRAWINGS

Figures

FIG. 3 is a rear elevation view.
FIG. 4 is a cross-sectional view taken along line 4-4 of FIG. 2.
FIG. 5 is an in use view showing a foldable waterproof rectangular cover removably attachable to a motorcycle.

DETAILED DESCRIPTION OF THE DRAWINGS

Figure 1:
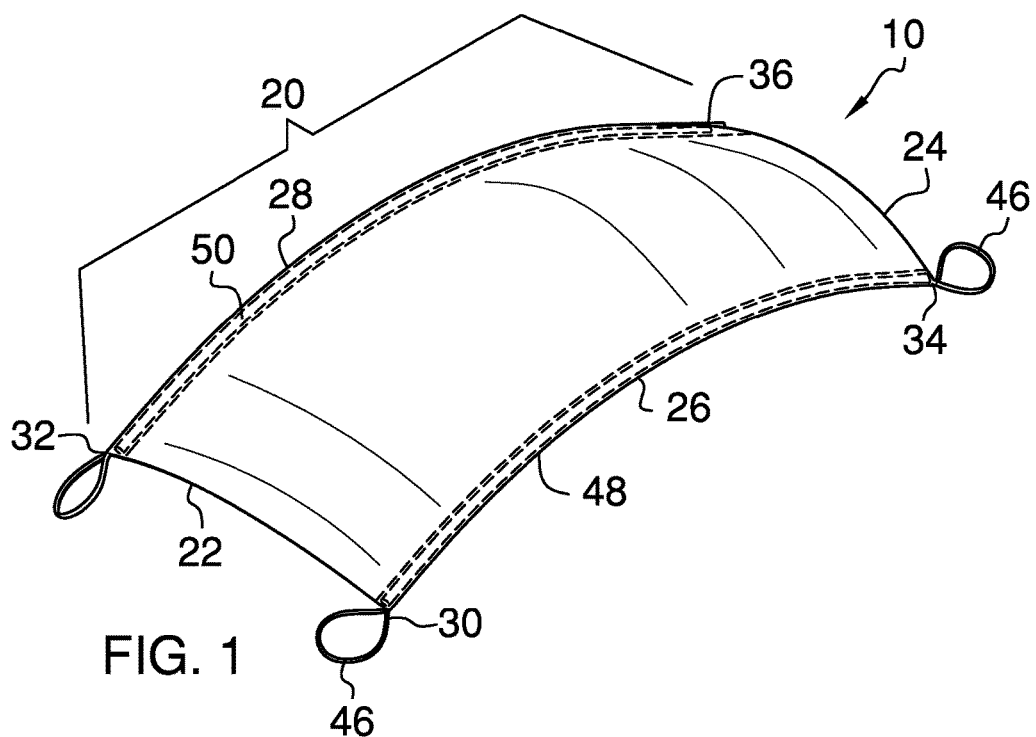
FIG. 1 is a front isometric view.
Figure 2:
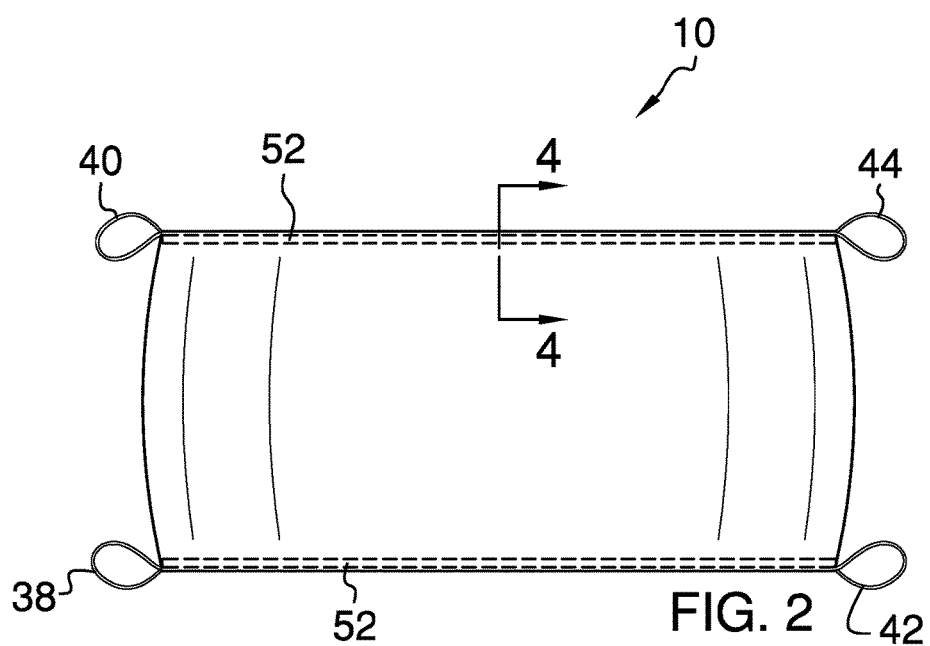
FIG. 2 is a top plan view.
Figure 6:
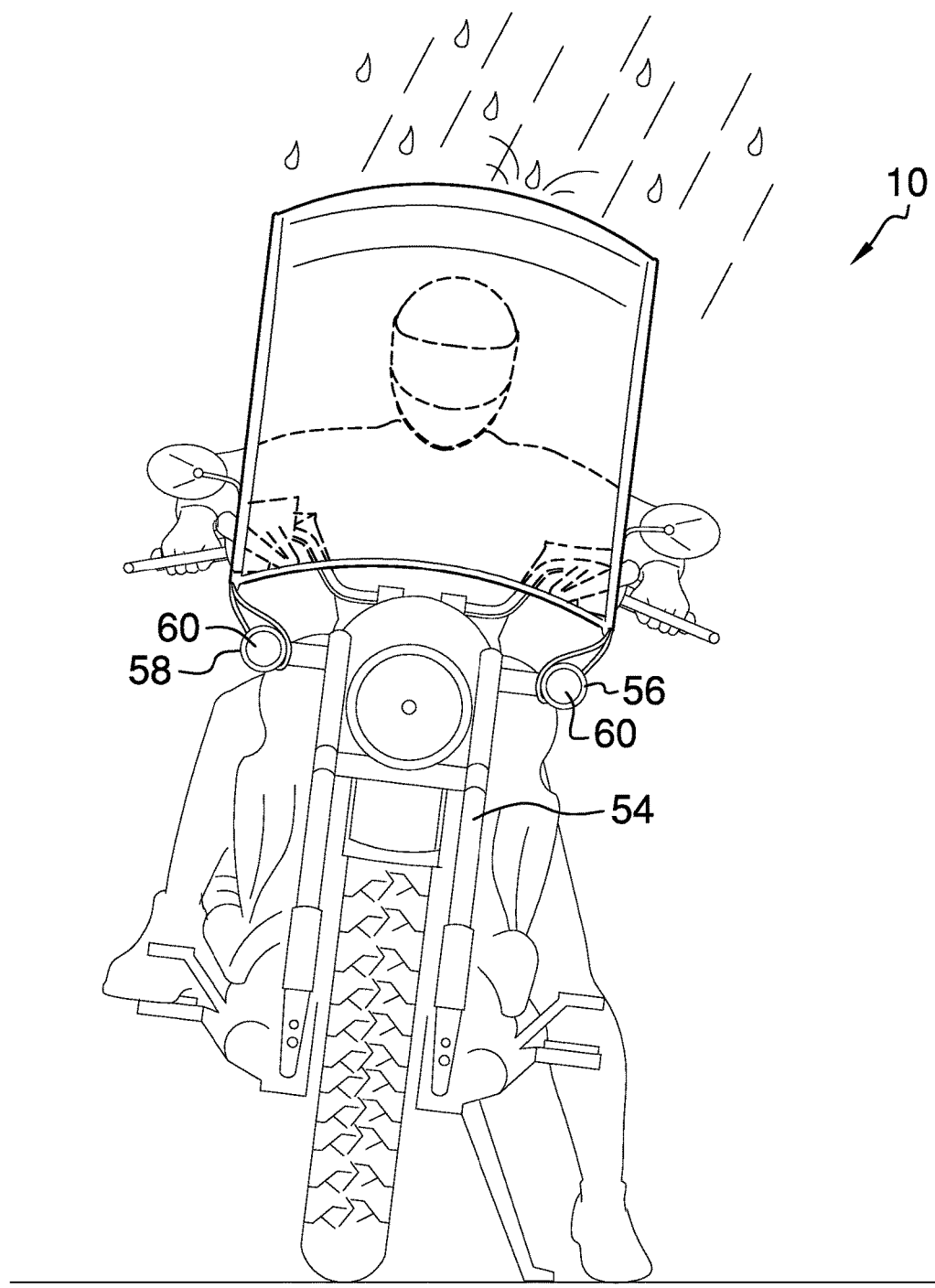
FIG. 6 is an in use view showing the foldable waterproof rectangular cover attached to the motorcycle.

With reference now to the drawings, and in particular FIGS. 1 through 6 thereof, an example of the instant removable motorcycle cover employing the principles and concepts of the present removable motorcycle cover and generally designated by the reference number 10 will be described.

Referring to FIGS. 1 through 6, the present removable motorcycle cover 10 is illustrated. The removable motorcycle cover 10 includes a foldable waterproof rectangular cover 20 having a front edge 22, a back edge 24, a right edge 26, a left edge 28, an upper right corner 30, an upper left corner 32, a lower right corner 34, and a lower left corner 36. Each of an upper right loop 38, an upper left loop 40, a lower right loop 42, and a lower left loop 44 of a pair of loops 46 is attached to each of the upper right corner 30, the upper left corner 32, the lower right corner 34, and the lower left corner 36, respectively. Each of a right rod 48 and a left rod 50 of a pair of flexible rods 52 is continuously disposed within the right edge 26 and the left edge 28, respectively, of the foldable waterproof rectangular cover 20.

A length of the foldable waterproof rectangular cover 20 substantially conforms to a length of a motorcycle 54. Each of the upper right loop 38 and the upper left loop 40 is removably engageable around each of a front right light 56 and a front left light 58 of a pair of front lights 60 of the motorcycle 54, and each of the lower right loop 42 and the lower left loop 44 is removably engageable around each of a rear right light 62 and a rear left light 64 of a pair of rear lights 66 of the motorcycle 54. The foldable waterproof rectangular cover 20 is thus removably disposed atop the motorcycle 54.

What is claimed is:
1. A removable motorcycle cover system comprising:
   a motorcycle having a pair of front lights including a front right light and a front left light, the motorcycle having a pair of rear lights including a rear right light and a rear left light;
   a foldable waterproof rectangular cover having a front edge, a back edge, a right edge, a left edge, an upper right corner, an upper left corner, a lower right corner, and a lower left corner;

a plurality of loops comprising an upper right loop, an upper left loop, a lower right loop, and a lower left loop, wherein each of the upper right loop, the upper left loop, the lower right loop, and the lower left loop is attached to each of the upper right corner, the upper left corner, the lower right corner, and the lower left corner, respectively; and a pair of flexible rods comprising a right rod and a left rod, wherein each of the right rod and the left rod is continuously disposed within the right edge and the left edge, respectively, of the foldable waterproof rectangular cover;

wherein a length of the foldable waterproof rectangular cover substantially conforms to a length of a motorcycle;

wherein each of the upper right loop and the upper left loop is removably engageable around each of the front right light and the front left light of the pair of front lights of the motorcycle;

wherein each of the lower right loop and the lower left loop is removably engageable around each of the rear right light and the rear left light of the pair of rear lights of the motorcycle;

wherein the foldable waterproof rectangular cover is removably disposed atop the motorcycle.

2. The removable motorcycle cover of claim 1 wherein a length of the foldable waterproof rectangular cover is in a range of approximately 167.64 centimeters to 182.88 centimeters.

3. The removable motorcycle cover of claim 2 wherein a width of the foldable waterproof rectangular cover is in a range of approximately 76.2 centimeters to 91.44 centimeters.

* * * * *